United States Patent [19] [11] 3,922,273
Deutsch [45] Nov. 25, 1975

[54] CYCLIZATION OF GLYOXYLIC ACID SEMICARBAZONE

[76] Inventor: Daniel H. Deutsch, 141 Kenworthy Drive, Pasadena, Calif. 91105

[22] Filed: Nov. 1, 1974

[21] Appl. No.: 520,004

[52] U.S. Cl. ............................ 260/248 AS; 424/249
[51] Int. Cl.² ........................................ C07D 253/06
[58] Field of Search .............................. 260/248 AS

[56] References Cited
UNITED STATES PATENTS
3,560,496   2/1971   Howes et al. ....................... 260/248
3,758,468   9/1973   Daams et al. ....................... 260/248

Primary Examiner—John M. Ford
Attorney, Agent, or Firm—Edgar W. Averill, Jr.

[57] ABSTRACT

Glyoxylic acid semicarbazone is cyclized by reacting it with a base such as sodium hydroxide at a temperature from 100° to 180°C in the presence of a high boiling alcohol solvent.

8 Claims, No Drawings

CYCLIZATION OF GLYOXYLIC ACID SEMICARBAZONE

BACKGROUND OF THE DISCLOSURE 6-azauridine triacetate has been previously described and utilized as a drug which is particularly useful in the treatment of psoriasis. 6-azauridine triacetate is prepared from 6-azauridine (6-azauracil riboside) by acetylation in accord with practices developed in the prior art. The 6-azauridine starting material to form the triacetate has been described in U.S. Pat. No. 3,468,759 as being formed from 6-azauracil by a fermentation process. In turn, various methods have been described in the prior art for formulating the starting 6-azauracil.

Perhaps the most effective process for forming 6-azauracil comprises the cyclization of glyoxylic acid semicarbazone. Thus, this semicarbazone is a valuable starting material in the synthesis of 6-azauracil which in turn is utilized to form valuable drug products through additional reactions. In copending applications Ser. No. 261,025, filed June 8, 1972, now U.S. Pat. No. 3,859,347, and Ser. No. 405,833, filed Oct. 12, 1973, now U.S. Pat. No. 3,859,348, by the present inventor, there is described one method of forming glyoxylic acid semicarbazone. Other methods are also known in the prior art.

The herein invention is particularly directed to the novel method of cyclization of the semicarbazone. The cyclized semicarbazone is known as the 6-azauracil mentioned above. Prior to the herein invention the semicarbazone was reported to be cyclized in an aqueous sodium hydroxide solution. The yield of 6-azauracil under these conditions has been found to be approximately only 20% which is exceedingly low. Another approach previously utilized to form the 6-azauracil involved carrying out the ring closing reaction in the presence of ethanol/sodium ethoxide/ethylene glycol. Over a period of 24 hours, the yield increases significantly in this reaction and has been reported to be up to 66%. However, the drawback of this approach is that the reaction must be carried out over an extremely long period of time and requires large quantities of expensive chemicals.

The method of the herein invention for the cyclization of the glyoxylic acid semicarbazone to 6-azauracil can be carried out in a short period of time, ranging from 10 minutes to 2 hours. The resulting product is found to be extremely pure and results in a high yield. It is believed that the invention will be further understood from the following description and specific examples.

SUMMARY OF THE INVENTION

The present invention is for a method of cyclizing glyoxylic acid semicarbazone comprising mixing glyoxylic acid semicarbazone with a high boiling alcohol solvent, adding a basic material to the mixture and heating the resulting solution for a period of time sufficient to cyclize the semicarbazone. The cyclized material is then recovered from the reaction mass.

The cyclization of glyoxylic acid semicarbazone by reaction with a heated base material is believed to occur according to the following equation utilizing sodium hydroxide, a preferred base as a material.

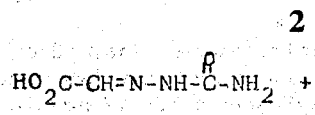
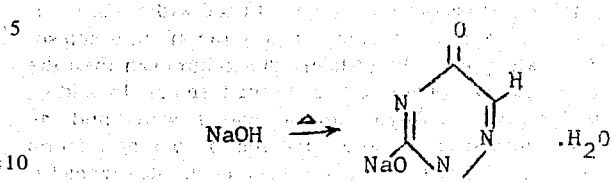

The utilization of the heated base, such as sodium hydroxide, provides a much cheaper reaction than the utilization of sodium ethoxide previously reported, thus resulting in 6-azauracil which is produced at a much lower cost. In addition to sodium hydroxide, other bases such as potassium hydroxide, lithium hydroxide, calcium oxide and the like might be used. A preferred solvent for the reaction is ethylene glycol without any additional material such as ethanol or the like, which had been reported in the prior art. The utilization of a single solvent, such as ethylene glycol significantly simplifies the solvent recovery in the process. Other single solvents which can be utilized include ethylene glycol monomethylether, diethylene glycol, diethylene glycol monomethylether, and the like. Additionally, other high boiling alcohols, such as the amyl alcohols, the hexyl alcohols, and similar high boiling petroleum fractions and aromatic solvents can be used.

The concentration of the glyoxylic acid semicarbazone in the solvent can vary from 2 to 35 weight percent. It is preferred to utilize as high a concentration of the semicarbazone as possible since the cost of solvent, as well as the recovery costs, become reduced accordingly, or can even be eliminated where so little solvent is present that the cost of recovery would not be justified. Thus, though it would be desirable to have an excess of 35 weight percent of the semicarbazone in the solvent, it has been found that the mixing and flowing of the material becomes impaired above this limit, and for this reason it is preferred not to exceed the 35 weight percent semicarbazone in the solvent. The amount of the hydroxide present will be a direct function of the glyoxylic semicarbazone used. The amount of the base chosen is determined by using 2 to 4 molar equivalent base relative to the glyoxylic acid semicarbazone. The more base used, the less time required for heating the reaction.

The temperature of the reaction can vary from 100° to 180°C, depending upon the particular equipment available or utilized, as well as the solvent chosen. The completion of the reaction can be determined by thin layer chromatography or U.V. spectra analysis.

After the reaction has been completed, the mixture is allowed to cool to room temperature. The product sometimes crystallizes directly. Otherwise, scratching or seeding may be required. Methanol may then be added to the mixture to thin it out. The amount of methanol can vary from 0.25 to 2 parts by volume and serves to increase fluidity and to create larger crystals. Small amounts of water may be used instead of methanol.

The partially crystalline mixture is then filtered off from the liquid, washed with methanol and air dried. The resultant product is chromatographically pure and free of the starting material as well as various other byproducts. Without any further treatment, the product is a salt of 6-azauracil; for example, if sodium hydroxide is the base material, then the sodium salt of 6-azauracil is formed. This product can be utilized without any further treatment to product 6-azauridine. If too much sodium was present by utilizing the sodium salt then the salt could be converted over to the free acid by adding material such as hydrochloric acid in water and the like. Thus, it can be seen that the aforegoing method provides a relatively expeditious and simple means for forming a pure salt of 6-azauracil for pure-6-azauracil, if desired. The following example will further illustrate the invention.

EXAMPLE

To 10 mls. of ethylene glycol in a 25 ml test tube was added 1.31 gms. of glyoxylic acid semicarbazone. The mixture was heated for 15 minutes in a silicone bath at 118°C. To this was added 1.20 gms. of sodium hydroxide flakes. The semicarbazone was partially undissolved before the base was added, but afterwards a relatively clear but turbid solution resulted. The solution was orange-yellow in color and there was a slow gas evolution. After 65 minutes a sample was removed for paper chromatography and the solution was mixed and scratched with a stirring rod whereupon crystallization set in. After a total 2 hours, the reaction mixture was removed from the bath, a sample set aside for paper chromatography and 10 mls. of methanol added to the partially crystalline mixture, and let stand overnight. The precipitate which was the sodium salt of 6-azauracil was filtered off, washed with methanol and air dried. The dried material weighed 1.22 gms. Paper chromatography showed that after 2 hours of heating, the conversion was much better than after one hour, but still not complete. From the intensities of the spots an estimated one-fourth to one-third of the starting material remained. The sodium salt of 6-azauracil obtained above was heated with 10 mls. of water and acidified with hydrochloric acid, and then placed in the refrigerator overnight and the product then collected and washed with cold water. The free 6-azauracil was air dired to yield 0.60 gms. The analysis of the 6-azauracil indicated it had a melting point of 272°C, uncorrected. Thin layer chromatography, ascending on Silufol UV 254, in Butanol:Acetic Acid:Water 8:2:2 showed only one spot with an $R_f$ of 0.81 corresponding to that of a known standard.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A method of cyclizing glyoxylic acid semicarbazone comprising:
   mixing glyoxylic acid semicarbazone with a single high boiling alcohol solvent therefor;
   adding a basic material to said solution;
   heating said solution for a period of time sufficient to cyclize said semicarbazone; and
   recovering the formed salt of 6-azauracil.

2. The method of claim 1 wherein:
   the concentration of the semicarbazone in the alcohol solvent is between 2 and 35 weight percent.

3. The method of claim 1 wherein the alcohol is selected from the group consisting of ethylene glycol, ethylene glycol monomethyl ether, diethylene glycol, diethylene glycol monomethyl ether, amyl alcohol and hexyl alcohol.

4. The method of claim 1 wherein the basic material is selected from the group consisting of sodium hydroxide, potassium hydroxide, lithium hydroxide and calcium hydroxide.

5. The method of claim 1 wherein said heating step comprises:
   heating the reaction mixture to between 100° and 180°C.

6. The method of claim 1 further comprising:
   cooling said mixture at the completion of the reaction and adding methanol thereto.

7. The method of claim 6 including the step of:
   adding from .25 to 2 parts by volume of methanol to the mixture.

8. The method of claim 6 further including the step of:
   acidulating the salt of 6-azauracil to 6-azauracil.

* * * * *